(12) United States Patent
Suzuki

(10) Patent No.: US 6,985,482 B2
(45) Date of Patent: Jan. 10, 2006

(54) CROSS-BAR SWITCH SYSTEM WITH REDUNDANCY

(75) Inventor: Katsuyuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 854 days.

(21) Appl. No.: 09/800,905

(22) Filed: Mar. 8, 2001

(65) Prior Publication Data

US 2001/0030942 A1 Oct. 18, 2001

(30) Foreign Application Priority Data

Mar. 9, 2000 (JP) .............................. 2000-065485

(51) Int. Cl.
*H04L 12/28* (2006.01)
*H04L 12/56* (2006.01)

(52) U.S. Cl. ...................... 370/380; 370/217; 370/218; 370/219; 370/220; 370/221; 370/225; 370/227; 370/228; 370/244; 370/380

(58) Field of Classification Search ........ 370/217–228, 370/260, 380, 386, 244, 395.2; 714/4, 800, 714/7, 13; 340/2.1, 2.2, 2.7; 379/279, 271; 710/317
See application file for complete search history.

(56) References Cited

U.S. PATENT DOCUMENTS

| 4,497,054 | A |   | 1/1985  | Read |
|-----------|---|---|---------|------|
| 5,361,249 | A |   | 11/1994 | Monastra et al. |
| 5,365,511 | A | * | 11/1994 | Kusano ...................... 370/220 |
| 5,459,718 | A | * | 10/1995 | Kusano ...................... 370/217 |
| 5,796,717 | A |   | 8/1998  | Shinbashi et al. |
| 5,844,887 | A |   | 12/1998 | Oren et al. |
| 6,035,414 | A | * | 3/2000  | Okazawa et al. .............. 714/7 |
| 6,131,169 | A | * | 10/2000 | Okazawa et al. .............. 714/7 |
| 6,226,261 | B1 | * | 5/2001 | Hurtta et al. ................ 370/219 |

FOREIGN PATENT DOCUMENTS

| JP | 64-88749   | 4/1989  |
| JP | 7-93172    | 4/1995  |
| JP | 7-264198   | 10/1995 |
| JP | 11-331374  | 11/1999 |

* cited by examiner

*Primary Examiner*—Wellington Chin
*Assistant Examiner*—Chuong Ho
(74) *Attorney, Agent, or Firm*—McGinn IP Law Group, PLLC

(57) ABSTRACT

A crossbar switch system with redundancy has N+1 crossbar switches. A first cross-bar switch has first outputs of each of a plurality of nodes applied to N input terminals thereof, an (N+1)th cross-bar switch has Nth outputs of each of the nodes applied to N input terminals thereof, and second to Nth (Ith) cross-bar switches each have first to Nth selection circuits, which are provided at respective input terminals thereof, to each of which are input mutually adjacent (I−1)th and Ith outputs among outputs of each of the nodes. Each (Jth) node has N selection switches, which are provided at input terminals thereof, to each of which are input Jth outputs of two mutually adjacent cross-bar switches among the first to (N+1)th cross-bar switches. In response to a selection control signal output from a failure processing circuit that executes crossbar switch failure processing, each of the selection circuits selects and outputs one of its two inputs.

20 Claims, 4 Drawing Sheets

FIG. 4

| FAULTY CROSS-BAR SWITCH | BYTE 0 | BYTE 1 | BYTE 2 | BYTE 3 | BYTE 4 | BYTE 5 | BYTE 6 | BYTE 7 |
|---|---|---|---|---|---|---|---|---|
| CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 15 | CROSS-BAR SWITCH 16 | CROSS-BAR SWITCH 17 | CROSS-BAR SWITCH 18 |
| CROSS-BAR SWITCH 11 | CROSS-BAR SWITCH 10 | CROSS-BAR SWITCH 12 | CROSS-BAR SWITCH 13 | CROSS-BAR SWITCH 14 | CROSS-BAR SWITCH 15 | CROSS-BAR SWITCH 16 | CROSS-BAR SWITCH 17 | CROSS-BAR SWITCH 18 |
| CROSS-BAR SWITCH 12 | CROSS-BAR SWITCH 10 | CROSS-BAR SWITCH 11 | CROSS-BAR SWITCH 13 | CROSS-BAR SWITCH 14 | CROSS-BAR SWITCH 15 | CROSS-BAR SWITCH 16 | CROSS-BAR SWITCH 17 | CROSS-BAR SWITCH 18 |
| CROSS-BAR SWITCH 13 | CROSS-BAR SWITCH 10 | CROSS-BAR SWITCH 11 | CROSS-BAR SWITCH 12 | CROSS-BAR SWITCH 14 | CROSS-BAR SWITCH 15 | CROSS-BAR SWITCH 16 | CROSS-BAR SWITCH 17 | CROSS-BAR SWITCH 18 |
| CROSS-BAR SWITCH 14 | CROSS-BAR SWITCH 10 | CROSS-BAR SWITCH 11 | CROSS-BAR SWITCH 12 | CROSS-BAR SWITCH 13 | CROSS-BAR SWITCH 15 | CROSS-BAR SWITCH 16 | CROSS-BAR SWITCH 17 | CROSS-BAR SWITCH 18 |
| CROSS-BAR SWITCH 15 | CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 16 | CROSS-BAR SWITCH 17 | CROSS-BAR SWITCH 18 |
| CROSS-BAR SWITCH 16 | CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 15 | CROSS-BAR SWITCH 17 | CROSS-BAR SWITCH 18 |
| CROSS-BAR SWITCH 17 | CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 15 | CROSS-BAR SWITCH 16 | CROSS-BAR SWITCH 18 |
| CROSS-BAR SWITCH 18 | CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 15 | CROSS-BAR SWITCH 16 | CROSS-BAR SWITCH 17 |
| NONE FAULTY | CROSS-BAR SWITCH 10 | CROSS-BAR SWITCH 11 | CROSS-BAR SWITCH 12 | CROSS-BAR SWITCH 13 | CROSS-BAR SWITCH 14 | CROSS-BAR SWITCH 15 | CROSS-BAR SWITCH 16 | CROSS-BAR SWITCH 17 |

CROSS-BAR SWITCH SYSTEM WITH REDUNDANCY

FIELD OF THE INVENTION

This invention relates to a computer system and, more particularly, to a system in which crossbar switches for connecting CPUs and memory of a computer or for connecting the nodes in a computer system constituted by multiple nodes are provided with redundancy.

BACKGROUND OF THE INVENTION

In modern computer systems, crossbar switches are used to switchingly connect the CPUs and memory of a computer, for example, or the nodes in a computer system constituted by multiple nodes. Crossbar switches are constructed on a plurality of LSI chips or cards or on a single LSI chip, which includes a plurality of crossbar switch blocks, in accordance with the bit slice or byte slice, etc.

SUMMARY OF THE DISCLOSURE

In the prior art there are the following problems, if a crossbar switch develops a failure, the switch cannot be allowed to degrade as in the manner of a CPU or memory, etc. That is, a faulty CPU is detached from the system when the system is restarted. The remaining CPUs can then execute processing. If a faulty crossbar switch is allowed to degrade, however, the computer CPUs and memory or the nodes can no longer be connected. As a consequence, the system will not operate.

Thus, a problem with the conventional crossbar switch is that system recovery cannot be achieved until the faulty parts of the crossbar switch are replaced. The result is prolonged system downtime.

Though a system in which all of the crossbar switch components are provided with redundancy, i.e., duplicated in order to avoid the foregoing problem is available, the system is high in cost and impractical.

An example of a crossbar switch having redundancy is disclosed in the specification of Japanese Patent Kokai (Laid-Open) Publication JP-A-7-264198. Here an N×N crossbar switch device is provided with an (N+1)th standby input line to construct an (N+1)×N cross-bar switch device. If an abnormality is detected in one of the N-number of working lines, a changeover is made to the standby line by a spatial switch, thereby furnishing data with an alternative path. Further, the specification of Japanese Patent Kokai (Laid-Open) Publication JP-A-11-331374 discloses a device serving as a cross-bar switch device used in an ATM switch or the like, wherein problems associated with the redundant cross-bar switch device (i.e., the fact that the switch is left in operation with no measures being taken to restore a faulty location) described in the aforesaid specification of JP-A-7-264198 are intended to be solved. In this device, a crossbar switch unit, which accommodates N-number of ports and implements a function for switching between any two of these ports, comprises a plurality of N×N cross-bar switch cards. The device further includes N-number of ports connected to the cross-bar switch unit by a plurality of working lines and at least one standby line, and a connection controller for outputtinga switch-abnormality detection signal upon detecting a switch abnormality in the cross-bar switch unit set in response to a switch signal. A port responds to the switch-abnormality detection signal by changing over at least one working line to at least one standby line. The entire disclosure of JP-A-7-264198 is herein incorporated by reference thereto.

In the cross-bar switch device described in the specification of JP-A-11-331374, packet data transmitted to an N×N cross-bar switch card detected to be abnormal is detoured to a standby line and is switched to a standby cross-bar switch card. When a crossbar switch card develops a failure, the destination to which the packet data is detoured (the switching destination) becomes the predetermined standby crossbar switch. Consequently, a problem which arises is delay time for data transfer, depending upon how the original cross-bar switch card and standby cross-bar switch that is the destination of the detour are disposed. A fluctuation in this data-transfer delay time is a major problem in computers in which the operating frequency is very high. The entire disclosure of JP-A-7-331374 is herein incorporated by reference thereto.

Accordingly, an object of the present invention is to provide a crossbar switch system in which rapid recovery of the system can be achieved at low cost when a crossbar switch fails.

According to an aspect of the present invention, there is provided a crossbar switch system comprising N+1 crossbar switches of which N is required and one is redundant. When the system develops a failure, a failure processing circuit recognizes that a crossbar switch is faulty and controls selection circuits, which are provided at input/outputs of the crossbar switches, after the system is restarted. As a result, the faulty crossbar switch is taken out of service and the redundant crossbar switch is placed in service.

According to a second aspect of the present invention, there is provided a cross-bar switch system with redundancy having a cross-bar switch set of a redundant structure comprising a plurality of cross-bar switches necessary for effecting connections between nodes of a plurality of nodes, and at least one additional redundant cross-bar switch;

(a) wherein a first cross-bar switch of said cross-bar switch set receives at input terminals thereof, first outputs among multiple N outputs of each of the plurality of nodes, and said one redundant cross-bar switch receives Nth outputs among N outputs of each of said plurality of nodes applied to input terminals thereof, N being an integer of 2 or more;

(b) each of the remaining cross-bar switches has M selection circuits to each of which receives two consecutive outputs of an order corresponding to that of the cross-bar switch, among N outputs of each of said plurality of nodes, the outputs of these M selection circuits being input to the cross-bar switch provided that M is an integer of 2 or more;

(c) each node of said plurality of nodes has N selection switches, which are provided at input terminals thereof, each of said selection switches receives two consecutive outputs of an output order corresponding to that of the node, among outputs of two mutually adjacent cross-bar switches, two by two, of said cross-bar switch set; and (d) in response to a selection control signal output from a failure processing circuit that executes cross-bar switch failure processing, each of said selection circuits selects and outputs one of its two inputs and, when one cross-bar switch fails, takes the failed cross-bar switch out of service.

More specifically, according to a third aspect of the present invention, there is provided a cross-bar switch system having N+1 cross-bar switches inclusive of redundancy wherein one cross-bar switch is provided in addition to N cross-bar switches required for connecting of nodes among first to Mth nodes (where M is a prescribed integer equal to or greater than 2); the first cross-bar switch receiving each first output among N outputs of each of the first to Mth nodes at M input terminals thereof; the (N+1)th cross-bar switch receiving each Nth output among N outputs of each of the first to Nth nodes at M input terminals thereof; an Ith (where I is an integer of 2 or more and not more than N) cross-bar switch having M selection circuits, which are provided at respective ones of M input terminal thereof, to each of which are input consecutive (I−1)th and Ith outputs, which correspond to the Ith cross-bar switch, among outputs of each of the first to Mth nodes; and a Jth (where J is an integer of 1 or more and not more than M) node having N selection switches, which are provided at input terminals of the node, to each of which are input Jth outputs of two mutually adjacent cross-bar switches among the first to (N+1)th cross-bar switches (N is integer≧2); wherein in response to a selection control signal output from a failure processing circuit that executes cross-bar switch failure processing, each of selection circuits selects and outputs one of the two inputs and, when one cross-bar switch fails, takes the failed cross-bar switch out of service.

According to a fourth aspect of the present invention, there is provided a cross-bar switch system with redundancy, (a) comprising N+1 cross-bar switches wherein one cross-bar switch is redundantly provided in addition to N cross-bar switches required for connecting of nodes among first to Mth nodes, where M and N are prescribed integers of 2 or more, respectively;

(b) each node of said first to Mth nodes outputting first to Mth output signals from output terminals thereof and receiving first to Nth input signals applied to input terminals thereof;

(c) the first cross-bar switch receiving each first output signal of each of said first to Mth nodes at M input terminals thereof;

(d) the (N+1)th cross-bar switch receiving each Nth output signal of each of said first to Mth nodes at M input terminals thereof;

(e) an Ith, where I is an integer of 2 or more and not more than N cross-bar switch having M selection circuits, which are provided at respective ones of M input terminals thereof, to each of which are input two signals, namely an (I−1)th output signal and an Ith output signal, of each of said first to Mth nodes; and (f) a Jth, where J is an integer of 1 or more and not more than M, node having N selection circuits, which are provided at N input terminals thereof, to each of which are input outputs of a Jth output port of each of mutually adjacent cross-bar switches among said first to (N+1)th cross-bar switches, namely of Kth and (K+1)th cross-bar switches, where K is an integer of 1 or more and not more than N;

(g) wherein in response to a selection control signal output from a failure processing circuit that executes cross-bar switch failure processing, each of said selection circuits selects and outputs one of two signals and, when one cross-bar switch fails, takes the failed cross-bar switch out of service.

In the present invention, the crossbar switches connect CPUs and a memory within a computer or perform switching between nodes of a multinode system having CPUs and memories wherein the memories of remote nodes are accessed via the crossbar switches.

Namely, in a system having cross-bar switches for connecting CPUs and a memory within a computer system or for connecting nodes in a computer system composed of a plurality of nodes, a cross-bar switch system with redundancy according to a fifth aspect comprises;

(a) N+1 cross-bar switches inclusive of N cross-bar switches that are indispensable for the system and one redundant cross-bar switch;

(b) selection circuits provided at inputs and outputs of said cross-bar switches; and (c) means, operable when the system fails, for performing control in such a manner that a cross-bar switch that has failed is taken out of service and the redundant cross-bar switch is placed in service by controlling said selection circuits by a failure processing circuit after the system is restarted, said failure processing circuit recognizing that said cross-bar switch has failed.

Each of said nodes inputs and outputs N bytes of data preferably on a byte-by-byte basis.

The failure-processing circuit includes: an (N+1)-bit cross-bar switch failure information register for storing whether failure has occurred or not with regard to the first to (N+1)th cross-bar switches; a selection-circuit control output circuit for outputting a selection control signal to each of the selection circuits based upon values in the cross-bar switch failure information register; and a multiple-failure detector for informing a system controller of occurrence of multiple failure when multiple cross-bar switches fail. M and N may be equal values.

Other aspects, features and advantages of the present invention will be apparent from the entire disclosure taken in conjunction with the accompanying drawings, in which like reference characters designate the same or similar parts throughout the figures thereof.

BRIEF DESCRIPTION OF THE DRAWINGS

FIG. 4 is a diagram illustrating the relationship between faulty crossbar switches and crossbar switches traversed by the bytes of transfer data.

PREFERRED EMBODIMENTS OF THE INVENTION

Figure 1:
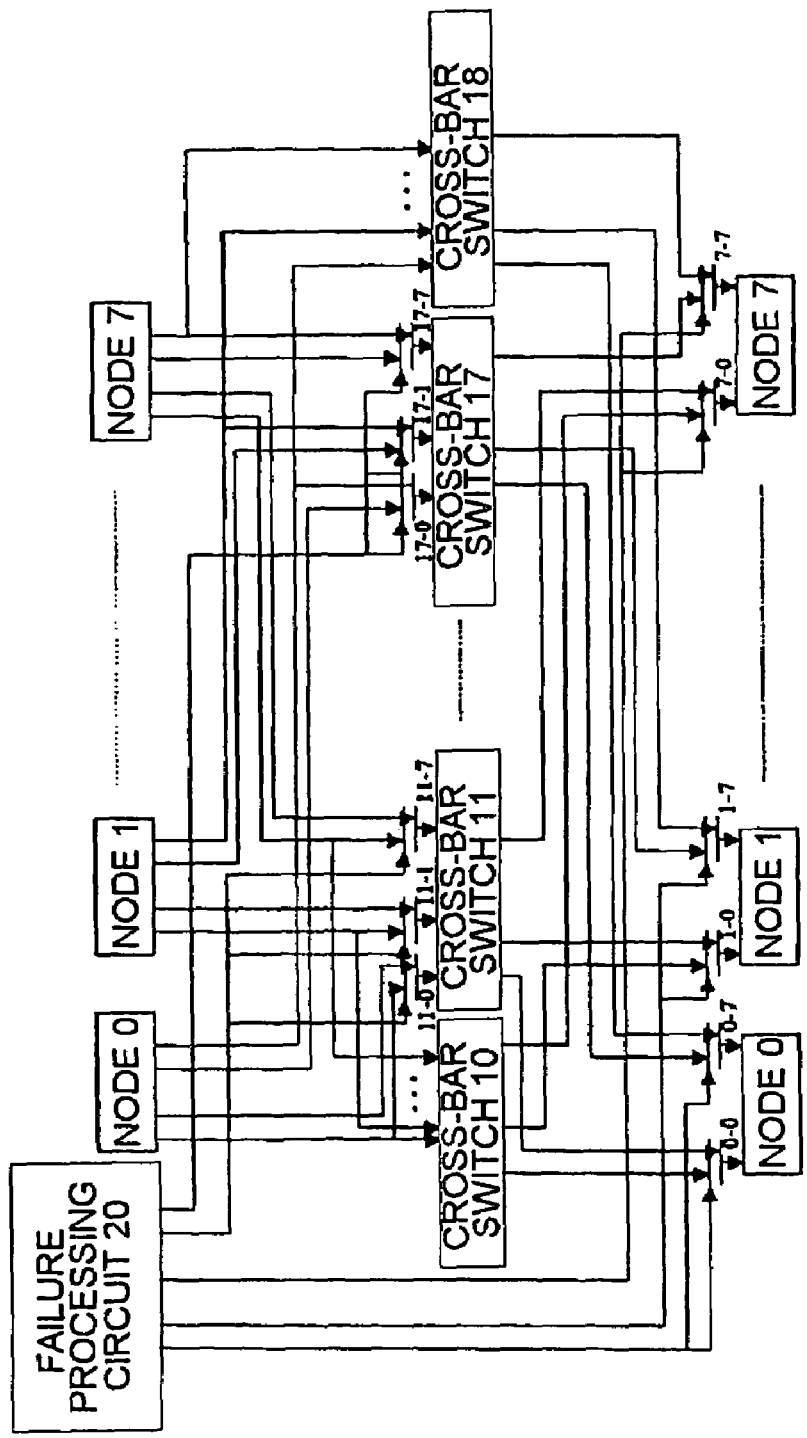
FIG. 1 is a diagram illustrating the configuration of a crossbar switch system according to an embodiment of the present invention.

A mode for carrying out the present invention will be described below.

According to an embodiment of the crossbar the crossbar switch system according to the present invention, the system is provided with N+1 crossbar switches of which N are required and one is redundant. If a failure processing circuit recognizes failure of a cross-bar switch when such a failure occurs in the system, the failure processing circuit controls selection circuits, which are provided at inputs and outputs of the cross-bar switches, after the system is restarted, to thereby take the faulty cross-bar switch out of service and place the redundant cross-bar switch in service.

More specifically, according to a preferred mode for carrying out the present invention, a cross-bar switch system has first to (N+1)th cross-bar switches wherein one cross-bar switch is provided in addition to N cross-bar switches (N=8 holds in FIG. 1) required for connecting of nodes among first to Mth (M=8 in FIG. 1) nodes; each node outputs first to Nth output signals from output terminals thereof and has first to Nth input signals applied to input terminals thereof; the first cross-bar switch (cross-bar switch 10 in FIG. 1) has first output signals of each of the first to Mth nodes input thereto; the (N+1)th cross-bar switch (cross-bar switch 8 in FIG. 1) has Nth output signals of each of the first to Mth nodes input thereto; an Ith (where I is an integer equal to or greater than 2 and not more than N) cross-bar switch (cross-bar switches 11 to 17 in FIG. 1) has first to Mth selection circuits (11-0 to 11-7, ..., 17-0 to 17-7), which are provided at the input thereof, to each of which are input two signals, namely an (I−1)th output signal and an Ith output signal, of each of the first to Mth nodes; a Jth (where J is an integer equal to or greater than 1 and not more than M) node has M selection circuits (0-0 to 0-7, 1-0 to 1-7, ..., 7-0 to 7-7), which are provided at N input terminals thereof, to each of which are input outputs of a Jth output port of each of mutually adjacent cross-bar switches among the first to (N+1)th cross-bar switches, namely of Kth and (K+1)th (where K is an integer equal to or greater than 1 and not more than N) cross-bar switches; and the selection circuits (11-0 to 11-7, ..., 17-0 to 17-7, 0-0 to 0-7, 1-0 to 1-7, ..., 7-0 to 7-7) each select and output one of two signals in response to a selection control signal output from a failure processing circuit (20) for cross-bar switch failure processing, whereby control is performed so as to take a cross-bar switch that has failed out of service and place the redundant cross-bar switch in service.

In this mode of carrying out the invention, each node inputs and outputs first to Nth items of data on a byte-by-byte basis.

The failure processing circuit has an (N+1)-bit cross-bar switch failure information register (200) for storing failure information, which is output from a system controller, regarding the N+1 cross-bar switches; a selection-circuit control output circuit (201) for outputting a selection control signal to the selection circuits; and a multiple-failure detector (202) for informing the system controller of occurrence of multiple failure when multiple cross-bar switches fail.

DETAILED DESCRIPTION OF EMBODIMENTS

Embodiments of the present invention will now be described in greater detail with reference to the drawings.

FIG. 1 is a diagram illustrating the configuration of a crossbar switch system according to an embodiment of the present invention. As shown in FIG. 1, the system includes eight nodes 0 to 7, nine cross-bar switches 10 to 18, a failure processing circuit 20, and selection circuits 0-0 to 0-7, ..., 7-0 to 7-7, 11-0 to 11-7, ..., and 17-0 to 17-7.

The nodes 0 to 7 are identically constructed and so are the crossbar switches 10 to 18. Each of the cross-bar switches 10 to 18 has eight input ports, eight output ports, an 8×8 cross-bar switch unit (not shown) and a connection controller (not shown) for controlling switching of the input and output ports to the cross-bar switch unit. Each port is constructed to input or output data on a per-byte (8-bit) basis. FIG. 1 is mainly for the purpose of describing the principle of the present invention; the number of nodes, for example, is not limited to eight, as a matter of course. As for the cross-bar switches and the failure detection, reference is made to JP-A-11-331374 which is incorporated herein by reference thereto.

Data communicated between any two nodes of the nodes 0 to 7 is transferred from the source node to the destination node by the crossbar switches 10 to 18.

The data width of data communication between two nodes is eight bytes (8×8=64 bits), by way of example.

Byte-0 data of the 8-byte data output from respective ones of the nodes 0 to 7 is input to the crossbar switch 10 at a respective one of the eight input ports.

With regard to cross-bar switch 11, byte-0 data and byte-1 data output from node 0 is input to the selection switch 11-0, the output of the selection switch 11-0 is applied to the first input port of the cross-bar switch 11, byte-0 data and byte-1 data output from node 1 is input to the selection switch 11-1, and the output of the selection switch 11-1 is applied to the second input port of the cross-bar switch 11. Similarly, byte-0 data and byte-1 data output from node 7 is input to the selection switch 11-7 and the output of the selection switch 11-7 is applied to the eighth input port of the cross-bar switch 11.

In response to a control signal from the failure processing circuit 20, the selection circuits 11-0 to 11-7 select one of byte-0 data and byte-1 data in the 8-byte data output from the nodes 0 to 7 and output the selected data to the cross-bar switch 11. The selection circuits 11-0 to 11-7 select the byte-1 data in the absence of a failure and select the byte-0 data when the crossbar switch 10 fails (see FIG. 4, described later).

With regard to cross-bar switch 17, byte-6 data and byte-7 data output from node 0 is input to the selection switch 17-0, the-output of the selection switch 17-0 is applied to the first input port of the cross-bar switch 17, byte-6 data and byte-7 data output from node 1 is input to the selection switch 17-1, and the output of the selection switch 17-1 is applied to the second input port of the cross-bar switch 17. Similarly, byte-6 data and byte-7 data output from node 7 is input to the selection switch 17-7 and the output of the selection switch 17-7 is applied to the eighth input port of the cross-bar switch 17.

The byte-7 data in the 8-byte data output from each of the nodes 0 to 7 enters respective ones of the eight input ports of crossbar switch 18.

The data output from the cross-bar switches 10 to 18 is selected by the selection circuits 0-0 to 0-7, 1-0 to 1-7, ..., 7-0 to 7-7 and input to the nodes 0 to 7.

The selection circuit 0-0 corresponding to node 0 receives as inputs the byte-0 data output from the first output port of cross-bar switch 10 and the byte-0 data output from the first output port of cross-bar switch 11, selects one of these inputs based upon the control signal from the failure processing circuit 20 and outputs the selected data to the node 0. The selection circuit 0-7 corresponding to node 0 receives as inputs the byte-7 data output from the first output port of cross-bar switch 17 and the byte-7 data output from the first output port of cross-bar switch 18, selects one of these inputs based upon the control signal from the failure processing circuit 20 and outputs the selected data to the node 0.

Similarly, the selection circuit 7-0 corresponding to node 7 receives as inputs the byte-0 data output from the eighth output port of cross-bar switch 10 and the byte-0 data output from the eighth output port of cross-bar switch 11, selects one of these inputs based upon the control signal from the failure processing circuit 20 and outputs the selected data to the node 7. The selection circuit 7-7 selects byte-7 data, which is output from the eighth output port of cross-bar switch 17 and the eighth output port of cross-bar switch 18, based upon the control signal from the failure processing circuit 20 and outputs the selected data to the node 7.

On the basis of failure information relating to a failure that has occurred, the failure processing circuit 20 outputs the selection control signal to the selection circuits 0-0 to 0-7, 1-0 to 1-7, ..., 7-0 to 7-7, 11-0 to 11-7, ..., 17-0 to 17-7.

Figure 2:
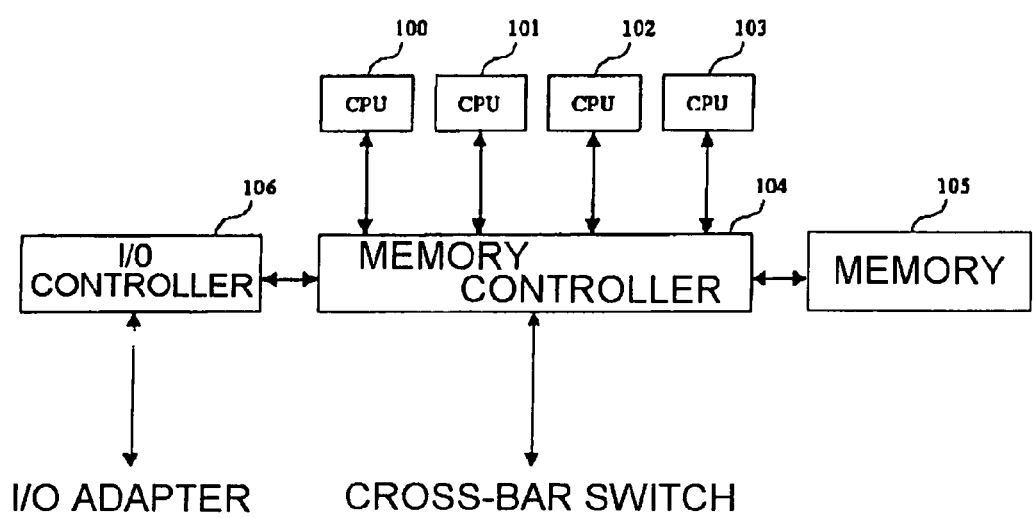
FIG. 2 is a block diagram illustrating the arrangement of CPUs according to the embodiment of the present invention.

FIG. 2 illustrates an example of the internal structure of the node 0 to 7 show in FIG. 1. Each node is composed of four CPUs 100 to 103, a memory controller 104, a memory 105 and an input/output (I/O) controller 106.

Each of the CPUs 100 to 103 performs memory access and I/O access via the memory controller 104.

In a case where a CPU accesses the memory 105 within its own node, the memory 105 is accessed from the memory controller 104. However, when a memory within another node is accessed, the access re quest is sent from the memory controller 104 to a memory controller of the other node via a cross-bar switch, thereby accessing the memory within the other node.

Figure 3:
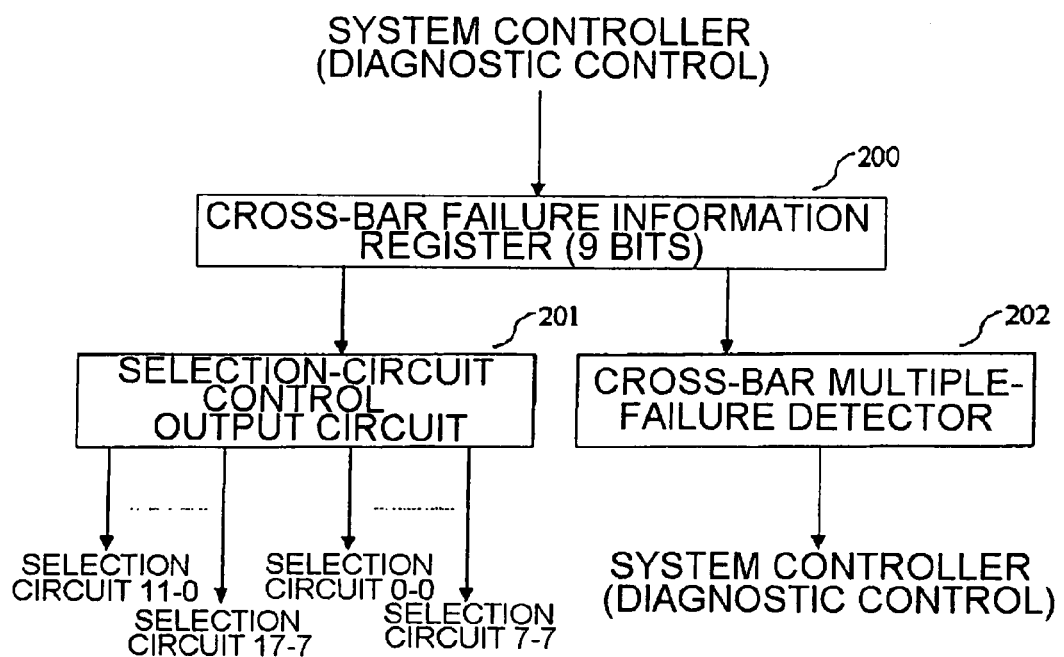
FIG. 3 is a block diagram illustrating the structure of a failure processing circuit according to the embodiment of the present invention.

FIG. 3 illustrates the internal structure of the failure processing circuit 20 shown in FIG. 1. The failure processing circuit 20 outputs the selection control signal to the selection circuits 0-0 to 7-7, 11-0 to 17-7 after the system is restarted, for example, whereby control is performed in such a manner that the faulty crossbar switch is taken out of service and the redundant crossbar switch is placed in service.

Failure information concerning the crossbar switches 10 to 18 output from a system controller enters a 9-bit crossbar switch failure information register 200. Each bit of the register 200 holds information as to whether the respective one of the cross-bar switches 10 to 18 is faulty or not.

The information from the crossbar switch failure information register 200 is output to a selection-circuit control output circuit 201. On the basis of this information, the selection-circuit control output circuit 201 outputs a selection control signal to each of the selection circuits 0-0 to 7-7, 11-0 to 17-7.

The information from the crossbar switch failure information register 200 is also output to a multiple-failure detector 202. If two or more of the crossbar switches 10 to 18 fail, the multiple-failure detector 202 notifies the system controller of the occurrence of multiple failure.

FIG. 4 illustrates, in table form, which crossbar switches switch each byte of data transferred between nodes when the crossbar switches 10 to 18 fail.

Under normal conditions in the absence of failure, the data of bytes 0 to 7 are switched by the cross-bar switches 10 to 17, respectively, as illustrated by the lowermost row of the table in FIG. 4.

If the crossbar switch 10, for example, develops a failure, the data of bytes 0 to 7 are switched by the crossbar switches 11 to 18, respectively, as indicated by the second row of the table of FIG. 4.

If any of the cross-bar switches 11 to 18 fails, then, in similar fashion, the data of each byte is switched by a respective one of the cross-bar switches indicated in FIG. 4 while the faulty cross-bar switch is avoided.

The operation of this embodiment of the invention will now be described.

As shown in FIG. 1, the crossbar switches 10 to 18 are cross-bar switches in a redundant arrangement for effecting communication between nodes. If a failure has not occurred, the crossbar switches 10 to 17 are employed and the crossbar switch 18 is not used.

Under normal conditions, the byte-0 data in the 8-byte data output from each of the nodes 0 to 7 is switched by the cross-bar switch 10, the byte-1 data is switched by the cross-bar switch 11 and the byte-7 data is switched by the cross-bar switch 17.

In a case where the CPU 100 in node 0 accesses the memory within node 1, which is a remote node, the byte-0 data in 8-byte request data is switched by the cross-bar switch 10 and is sent to node 1.

Though the byte-0 data is sent from node 0 to the selection circuit 11-0, the latter responds to the control signal from the failure processing circuit 20 by selecting and outputting its other input, namely the byte-1 data in the 8-byte data from node The byte-0 data output from the cross-bar switch 10 enters the selection circuit 1-0 which, in response to the selection control signal from the failure processing circuit 20, selects the byte-0 data and outputs this data to the node 1.

If the system develops a failure and it is determined as a result of diagnostic processing executed after the occurrence of the failure that the cross-bar switch 10 is faulty, then, in response to the selection control signal output from the failure processing circuit 20 to the selection circuits after the system is restarted, the cross-bar switch 10 is taken out of service and the items of byte-0 data, byte-1 data and byte-7 data in the 8-byte data output from nodes 0 to 7 are switched by the cross-bar switches 11, 12 and 18, respectively.

As for the transfer of data from node 0 to node 1 in this case, the byte-0 data that was output from node 0 to selection circuit 11-0 is selected by the selection control signal from the failure processing circuit 20 and is delivered to the cross-bar switch 11.

The byte-0 data output from cross-bar switch 11 enters the selection circuit 1-0, and the latter responds to the selection control signal from the failure processing circuit 20 by selecting the byte-0 data and inputting it to the node 1.

If a failure occurs in any of the cross-bar switches 11 to 18, each byte of node transfer data is transferred by control similar to that set forth above via the cross-bar switches indicated in FIG. 4.

If two or more of the crossbar switches 10 to 18 fail, then the crossbar multiple-failure detector 202 in the failure processing circuit 20 detects multiple crossbar failure and so informs the system controller. In this case, the system is not restarted and remains down until it is repaired.

According to the embodiment described above, each node outputs 8-byte data, and each selection circuit and each port of the crossbar switches inputs and outputs data in single-byte units. However, the present invention is not limited to this implementation and it goes without saying that an implementation in which data is input and output in word units or bit units may be adopted.

Further, the present invention is not only ideal for application to a multinode computer system but can be similarly applied to crossbar switches that control the connections between multiple CPUs and memories.

The meritorious effects of the present invention are summarized as follows.

The present invention has a number of advantageous effects, which will now be described.

First, in a case where cross-bar switches are provided with redundancy and a cross-bar switch fails, the failure processing circuit controls the selection circuits, which are provided at the inputs and outputs of each of the cross-bar switches, based upon failure information, thereby making it possible to achieve an operation in which the faulty cross-bar switch is avoided after the system is started up.

Second, it is possible to avoid a situation in which system recovery cannot be achieved until a faulty crossbar switch is repaired. Avoiding this situation does not require that all crossbar switches be made redundant.

Third, in a case where a cross-bar switch is designed to be inserted into and withdrawn from a live wire, it is possible for cross-bar switch components to be replaced on-line. This means that maintenance can be performed without shutting down the system.

Fourth, when switching is performed in the event of failure of a crossbar switch, the switching takes place between crossbar switches whose data branching inputs are mutually adjacent. As a consequence, the fluctuation in data delay time caused by detouring the data, which is a problem encountered with the system of JP-A-11-331374 described earlier, either does not occur or is so small as to be negligible. This has applications in computer systems that operate at high operating frequencies.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A cross-bar switch system with redundancy having a cross-bar switch set of a redundant structure, comprising:

a plurality of crossbar switches for effecting connections between nodes of a plurality of nodes; and at least one additional redundant cross-bar switch, wherein:

(a) a first cross-bar switch of said cross-bar switch set receives at input terminals thereof, first outputs among multiple N outputs of each of the plurality of nodes, and said one redundant cross-bar switch receives Nth outputs among N outputs of each of said plurality of nodes applied to input terminals thereof N, being an integer of 2 or more;

(b) each of remaining cross-bar switches includes M selection circuits, each of which receives two consecutive outputs of an order corresponding to that of the cross-bar switch, among N outputs of each of said plurality of nodes, the outputs of these M selection circuits being input to the cross-bar switch, M being an integer of 2 or more;

(c) each node of said plurality of nodes includes N selection switches, which are provided at input terminals thereof, each of said selection switches receives two consecutive outputs of an output order corresponding to that of the node, among outputs of two mutually adjacent cross-bar switches, two by two, of said cross-bar switch set; and (d) in response to a selection control signal output from a failure processing circuit that executes cross-bar switch failure processing, each of said selection circuits selects and outputs one of its two inputs and, when one cross-bar switch fails, takes the failed cross-bar switch out of service.

2. A cross-bar switch system with redundancy, comprising N+1 cross-bar switches, wherein:

(a) one cross-bar switch is redundantly provided, in addition to N cross-bar switches required for connecting of nodes among first to Mth nodes where M and N are prescribed integers equal to or greater than 2, respectively;

(b) the first cross-bar switch receives each first output among N outputs of each of said first to Mth nodes at M input terminals thereof;

(c) the (N+1)th cross-bar switch receives each Nth output among N outputs of each of said first to Nib nodes at M input tenninals thereof;

(d) an Ith, where I is an integer of 2 or more and less than N, cross-bar switch having M selection circuits, which are provided at respective ones of M input terminals thereof, to each of which are input consecutive (I−1)th and Ith outputs, which correspond to said Ith cross-bar switch, among outputs of each of said first to Mth nodes;

(e) a Jth, where J is an integer of 1 or more and not more than M, node having N selection switches, which are provided at input terminals of said node, to each of which are input Jth outputs of two mutually adjacent cross-bar switches among said first to (N+1)th crass-bar switches, where N is an integer of 2 or more; and (f) in response to a selection control signal output from a failure processing circuit that executes cross-bar switch failure processing, each of said selection circuits selects and outputs one of its two inputs and, when one cross-bar switch fails, takes the failed cross-bar switch out of service.

3. A cross-bar switch system with redundancy, comprising N+1 cross-bar switches, wherein:

(a) one cross-bar switch is redundantly provided, in addition to N cross-bar switches required for connecting of nodes among first to Mth nodes, where M and N are prescribed integers of 2 or more, respectively;

(b) each node of said first to Mth nodes outputting first to Mth output signals from output terminals thereof and receiving first to Nth input signals applied to input terminals thereof;

(c) the first cross-bar switch receiving each first output signal of each of said first to Mth nodes at M input terminals thereof;

(d) the (N+1)th cross-bar switch receiving each Nth output signal of each of said first to Mth nodes at M input terminals thereof;

(e) an Ith, where I is an integer of 2 or more and not more than N, cross-bar switch having M selection circuits, which are provided at respective ones of M input terminals thereof, to each of which are input two signals, namely an (I−1)th output signal and an Ith output signal, of each of said first to Mth nodes;

(f) a Jth, where J is an integer of 1 or more and not more than M, node having N selection circuits, which are provided at N input terminals thereof, to each of which are input outputs of a Jth output port of each of mutually adjacent cross-bar switches among said first to (N+1)th cross-bar switches, namely of Kth and (K+1)th cross-bar switches, where K is an integer of 1 or more and not more than N; and (g) in response to a selection control signal output from a failure processing circuit that executes cross-bar switch failure processing, each of said selection circuits selects and outputs one of two signals and, when one cross-bar switch fails, takes the failed cross-bar switch out of service.

4. In a system having cross-bar switches for connecting Central Processing Units (CPUs) and a memory within a computer system or for connecting nodes in a computer system composed of a plurality of nodes, a cross-bar switch system with redundancy comprising:

(a) N+1 cross-bar switches inclusive of N cross-bar switches and one redundant cross-bar switch;

(b) selection circuits provided at inputs and outputs of said cross-bar switches; and (c) means, operable when the system fails, for performing control in such a manner that a cross-bar switch that has failed is taken out of service and the redundant cross-bar switch is placed in service by controlling said selection circuits by a failure processing circuit after the system is restarted, said failure processing circuit recognizing that said cross-bar switch has failed, each of said selection circuits selects and outputs one of its two inputs and, when one cross-bar switch fails, takes the failed cross-bar switch out of service.

5. The system according to claim 3, wherein each of said nodes inputs and outputs N bytes of data on a byte-by-byte basis.

6. The system according to claim 1, wherein said failure-processing circuit comprises:

an (N+1)-bit cross-bar switch failure information register for storing whether failure has occurred or not with regard to said first to (N+1)th cross-bar switches;

a selection-circuit control output circuit for outputting a selection control signal to each of said selection circuits based upon values in said cross-bar switch failure information register; and a multiple-failure detector for informing a system controller of occurrence of multiple failure when multiple cross-bar switches fail.

7. The system according to claim 2, wherein said failure-processing circuit comprises:

an (N+1)-bit cross-bar switch failure information register for storing whether failure has occurred or not with regard to said first to (N+1)th cross-bar switches;

a selection-circuit control output circuit for outputting a selection control signal to each of said selection circuits based upon values in said cross-bar switch failure information register; and a multiple-failure detector for informing a system controller of occurrence of multiple failure when multiple cross-bar switches fail.

8. The system according to claim 3, wherein said failure-processing circuit comprises:

an (N+1)-bit cross-bar switch failure information register for storing whether failure has occurred or not with regard to said first to (N+1)th cross-bar switches;

a selection-circuit control output circuit for outputting a selection control signal to each of said selection circuits based upon values in said cross-bar switch failure information register; and a multiple-failure detector for informing a system controller of occurrence of multiple failure when multiple cross-bar switches fail.

9. The system according to claim 4, wherein said failure-processing circuit comprises:

an (N+1)-bit cross-bar switch failure information register for storing whether failure has occurred or not with regard to said first to (N+1)th cross-bar switches;

a selection-circuit control output circuit for outputting a selection control signal to each of said selection circuits based upon values in said cross-bar switch failure information register; and a multiple-failure detector for informing a system controller of occurrence of multiple failure when multiple cross-bar switches fail.

10. The system according to claim 1, wherein said cross-bar switches connect Central Processing Units (CPUs) and a memory within a computer, or perform switching between nodes of a multinode system having CPUs and memories, wherein the memories of remote nodes are accessed via the cross-bar switches.

11. The system according to claim 2, wherein said cross-bar switches connect Central Processing Units (CPUs) and a memory within a computer, or perform switching between nodes of a multinode system having CPUs and memories, wherein the memories of remote nodes are accessed via the cross-bar switches.

12. The system according to claim 3, wherein said cross-bar switches connect Central Processing Units (CPUs) and a memory within a computer, or perform switching between nodes of a multinode system having CPUs and memories, wherein the memories of remote nodes are accessed via the cross-bar switches.

13. The system according to claim 4, wherein said cross-bar switches connect Central Processing Units (CPUs) and a memory within a computer, or perform switching between nodes of a multinode system having CPUs and memories, wherein the memories of remote nodes are accessed via the cross-bar switches.

14. The system according to claim 6, wherein said cross-bar switches connect Central Processing Units (CPUs) and a memory within a computer, or perform switching between nodes of a multinode system having CPUs and memories, wherein the memories of remote nodes are accessed via the cross-bar switches.

15. The system according to claim 1, wherein M and N are equal values.

16. The system according to claim 2, wherein M and N are equal values.

17. The system according to claim 3, wherein M and N are equal values.

18. A cross-bar switch system with redundancy having a cross-bar switch set of a redundant structure, said cross-bar switch system comprising:

a plurality of cross-bar switches that provide connections between nodes of a plurality of nodes and including selection circuits, each said cross-bar switch receivine two inputs; and at least one additional redundant cross-bar switch, wherein, in response to a selection control signal output from a failure processing circuit that executes cross-bar switch failure processing, each of said selection circuits selects and outputs one of its two inputs and, when one of said cross-bar switches fails, takes the failed cross-bar switch out of service.

19. A method of providing redundancy in a cross-bar switch system, said method comprising:

providing a plurality of cross-bar switches for effecting connections between nodes of a plurality of nodes; and providing at least one additional redundant cross-bar switch, wherein:

(a) a first cross-bar switch of said cross-bar switch set receives at input terminals thereof, first outputs among multiple N outputs of each of the plurality of nodes, and said one redundant cross-bar switch receives Nth outputs among N outputs of each of said plurality of nodes applied to input terminals thereof; N being an integer of 2 or more;

(b) each of remaining cross-bar switches includes M selection circuits, each of which receives two consecutive outputs of an order corresponding to that of the cross-bar switch, among N outputs of each of said plurality of nodes, the outputs of these M selection circuits being input to the cross-bar switch, M being an integer of 2 or more;

(c) each node of said plurality of nodes includes N selection switches, which are provided at input terminals thereof; each of said selection switches receives two consecutive outputs of an output order corresponding to that of the node, among outputs of two mutually adjacent cross-bar switches, two by two, of said cross-bar switch set; and (d) in response to a selection control signal output from a failure processing circuit that executes cross-bar switch failure processing, each of said selection circuits selects and outputs one of its two inputs and, when one cross-bar switch fails, takes the failed cross-bar switch out of service.

20. A method of providing redundancy in a cross-bar switch system, said method comprising:

providing a plurality of cross-bar switches that provide connections between nodes of a plurality of nodes and including selection circuits, each said cross-bar switch receiving two inputs; and providing at least one additional redundant cross-bar switch, wherein, in response to a selection control signal output from a failure processing circuit that executes cross-bar switch failure processing, each of said selection circuits selects and outputs one of its two inputs and, when one of said cross-bar switches fails, takes the failed cross-bar switch out of service.

* * * * *